US009774855B2

(12) United States Patent
Gao et al.

(10) Patent No.: US 9,774,855 B2
(45) Date of Patent: Sep. 26, 2017

(54) METHOD AND DEVICE FOR ASSESSING VIDEO ENCODING QUALITY

(71) Applicant: Huawei Technologies Co., Ltd., Shenzhen (CN)

(72) Inventors: Shan Gao, Shenzhen (CN); Lina Sun, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 181 days.

(21) Appl. No.: 14/751,373

(22) Filed: Jun. 26, 2015

(65) Prior Publication Data

US 2015/0296208 A1    Oct. 15, 2015

Related U.S. Application Data

(63) Continuation of application No. PCT/CN2013/080882, filed on Aug. 6, 2013.

(30) Foreign Application Priority Data

Feb. 6, 2013    (CN) .......................... 2013 1 0048015

(51) Int. Cl.
*H04N 19/124*    (2014.01)
*H04N 17/00*    (2006.01)
(Continued)

(52) U.S. Cl.
CPC ......... *H04N 19/124* (2014.11); *H04N 17/004* (2013.01); *H04N 19/85* (2014.11);
(Continued)

(58) Field of Classification Search
CPC .... H04N 17/004; H04N 19/124; H04N 19/85; H04N 19/14; H04N 19/154; H04N 19/174; H04N 19/197
See application file for complete search history.

(56) References Cited

U.S. PATENT DOCUMENTS

2004/0081361 A1    4/2004 Chen et al.
2009/0244289 A1    10/2009 Raake et al.
(Continued)

FOREIGN PATENT DOCUMENTS

CN        1816141 A     8/2006
CN     101635846 A      1/2010
(Continued)

OTHER PUBLICATIONS

J. Hu et al., "Use of content complexity factors in video over IP quality monitoring," 2009 International Workshop on Quality of Multimedia Experience, San Diego, CA, 2009, pp. 216-221.*
(Continued)

*Primary Examiner* — Christopher S Kelley
*Assistant Examiner* — Maria Vazquez Colon
(74) *Attorney, Agent, or Firm* — Conley Rose, P.C.

(57) ABSTRACT

A method and a device for assessing video encoding quality. The method includes: acquiring a quantization parameter of a slice of a video frame and a quantity of bytes per pixel of the slice of the video frame of the video stream; determining complexity of content of the video according to the quantity of bytes per pixel of the slice of the video frame of the video stream; and predicting the video encoding quality according to the complexity of content of the video and the quantization parameter of the video. In the present invention, the complexity of content of the video is also considered in predicting the video encoding quality. Therefore, encoding quality predicted by a model that is obtained by considering the complexity of content of the video better satisfies subjective feelings of human eyes, thereby improving accuracy of prediction.

26 Claims, 2 Drawing Sheets

(51) Int. Cl.
*H04N 19/85* (2014.01)
*H04N 19/196* (2014.01)
*H04N 19/14* (2014.01)
*H04N 19/154* (2014.01)
*H04N 19/174* (2014.01)

(52) U.S. Cl.
CPC ............ *H04N 19/14* (2014.11); *H04N 19/154* (2014.11); *H04N 19/174* (2014.11); *H04N 19/197* (2014.11)

(56) References Cited

U.S. PATENT DOCUMENTS

| | | | |
|---|---|---|---|
| 2011/0013694 A1* | 1/2011 | Watanabe | H04N 17/004 375/240.12 |
| 2011/0085605 A1 | 4/2011 | Xie et al. | |
| 2011/0243233 A1 | 10/2011 | Alshina et al. | |
| 2011/0292997 A1 | 12/2011 | An et al. | |
| 2013/0314553 A1 | 11/2013 | Sun et al. | |

FOREIGN PATENT DOCUMENTS

| | | |
|---|---|---|
| CN | 101695141 A | 4/2010 |
| CN | 102685548 A | 9/2012 |
| CN | 102740108 A | 10/2012 |
| CN | 102868907 A | 1/2013 |
| EP | 2252073 A1 | 11/2010 |
| EP | 2296379 A1 | 3/2011 |

OTHER PUBLICATIONS

Foreign Communication From a Counterpart Application, European Application No. 13874341.4, European Notice of Allowance dated Jun. 24, 2016, 7 pages.

Partial English Translation and Abstract of Chinese Patent Application No. CN1816141A, May 29, 2015, 7 pages.

Partial English Translation and Abstract of Chinese Patent Application No. CN102868907A, May 29, 2015, 5 pages.

"Series P: Terminals and Subjective and Objective Assessment Methods, Models and tools for quality assessment of streamed media, Parametric non-intrusive bitstream assessment of video media streaming quality—Higher resolution application area," ITU-T, P.1202.2, May 2013, 64 pages.

Foreign Communication From a Counterpart Application, Chinese Application No. 201310048015.0, Chinese Search Report dated Jul. 30, 2014, 7 pages.

Foreign Communication From a Counterpart Application, European Application No. 13874341.4, Extended European Search Report dated Jul. 28, 2015, 7 pages.

Foreign Communication From a Counterpart Application, PCT Application No. PCT/CN2013/080882, English Translation of International Search Report dated Nov. 14, 2013, 2 pages.

Foreign Communication From a Counterpart Application, PCT Application No. PCT/CN2013/080882, English Translation of Written Opinion dated Nov. 14, 2013, 9 pages.

\* cited by examiner

METHOD AND DEVICE FOR ASSESSING VIDEO ENCODING QUALITY

CROSS-REFERENCE TO RELATED APPLICATIONS

This application is a continuation of International Application No. PCT/CN2013/080882, filed on Aug. 6, 2013, which claims priority to Chinese Patent Application No. 201310048015.0, filed on Feb. 6, 2013, both of which are hereby incorporated by reference in their entireties.

TECHNICAL FIELD

Embodiments of the present invention relate to the field of communications technologies, and more specifically, to a method and a device for assessing video encoding quality.

BACKGROUND

With development of network technologies, video services, such as video on demand, web television, and video-telephony, have become main services of a broadband network, and will become main services of a the third generation (3G) wireless network.

Because a quantity of video services is large, realtimeness is high, and a user is highly sensitive to the video services, an operator needs to monitor quality of transmitted video services and adopt a corresponding measure in a timely manner to perform adjustment, so as to meet the user's requirement for experiencing the video services. Quality of a video is affected by many factors, for example, distortion due to compression, how a parameter at a video coder and decoder adapts to a transmission channel, and quality of service (such as bandwidth limit, packet loss, delay, or jitter) of the transmission channel.

In an existing objective video quality assessment method without reference, a model for predicting encoding quality (the encoding quality is also referred to as benchmark quality or compression quality) considers only impact of encoding information (for example, a bit rate, a Codec, a video pause, and a network packet loss). Considerations of the model for predicting encoding quality in the no reference objective video quality assessment method are incomplete, and the method cannot accurately reflect subjective feelings of human eyes, and has limitations to an extent. Therefore, accuracy of predicting encoding quality is low.

SUMMARY

Embodiments of the present invention provide a method and a device for assessing video encoding quality, which can improve accuracy of predicting encoding quality.

According to a first aspect, a method for assessing video encoding quality is provided, where the method includes: acquiring a quantization parameter of a slice of a video frame of a video stream and a quantity of bytes per pixel of the slice of the video frame of the video stream; determining a quantization parameter of a video according to the quantization parameter of the slice of the video frame of the video stream, and determining complexity of content of the video according to the quantity of bytes per pixel of the slice of the video frame of the video stream; and predicting the video encoding quality according to the complexity of content of the video and the quantization parameter of the video.

With reference to the first aspect, in a first possible implementation manner, specific implementation of the determining a quantization parameter of a video according to the quantization parameter of the slice of the video frame of the video stream may be determining an average value or a weighted average value of the quantization parameter of the slice of the video frame of the video stream as the quantization parameter of the video.

With reference to the first possible implementation manner of the first aspect, in a second possible implementation manner, implementation of the determining an average value or a weighted average value of the quantization parameter of the slice of the video frame of the video stream as the quantization parameter of the video may be determining the quantization parameter of the video as follows:

$$f\_video\_qp = \frac{\sum_{i=1}^{N1} i\_slice\_qp_i}{N1}, \text{ or}$$

$$f\_video\_qp = \frac{\sum_{i=1}^{N1} w_i \cdot i\_slice\_qp_i}{\sum_{i=1}^{N1} w_i},$$

where f_video_qp is the quantization parameter of the video, N is a quantity of slice quantization parameters of slices of the video stream, i_slice_qp$_i$ is a quantization parameter of the i$^{th}$ slice among quantization parameters of the N1 slices, N1 is a positive integer, and $\omega_i$ is a weight corresponding to the i$^{th}$ slice.

With reference to the first aspect or the first possible implementation manner or the second possible implementation manner of the first aspect, in a third possible implementation manner, implementation of the determining complexity of content of the video according to the quantity of bytes per pixel of the slice of the video frame of the video stream may be determining a quantity of bytes per pixel of the k$^{th}$ slice among Num slices of the video frame as follows:

$$f\_slice\_byte\_per\_pixel_k = \frac{i\_slice\_size_k}{i\_slice\_pixel_k},$$

where i_slice_size$_k$ is a quantity of bytes of the k$^{th}$ slice among the Num slices of the video frame, i_slice_pixel$_k$ is a quantity of pixels of the k$^{th}$ slice among the Num slices of the video frame, and k is a positive integer, where in the video frame, k ranges from 1 to Num, and Num is a positive integer, determining complexity of content of the k$^{th}$ slice among the Num slices of the video frame as follows:

f_slice_content_complecity$_k$=a[i_slice_qp$_k$]·f_slice_byte_per_pixel$_k$+b[i_slice_qp$_k$], where both a[i_slice_qp$_k$] and b[i_slice_qp$_k$] are values corresponding to a quantization parameter of the k$^{th}$ slice among the Num slices of the video frame, determining complexity of content of the video frame as follows:

$$f\_frame\_content\_complexity = \frac{\sum_{k=1}^{Num} f\_slice\_content\_complexity_k}{Num},$$

and determining the complexity of content of the video according to the complexity of content of the video frame.

With reference to the third possible implementation manner of the first aspect, in a fourth possible implementation manner, implementation of the determining the complexity of content of the video according to the complexity of content of the video frame may be as follows:

$$f\_video\_content\_complexity = \frac{\sum_{j=1}^{M} f\_frame\_content\_complexity_j}{M},$$

where f_video_content_complexity is the complexity of content of the video, the video stream includes M video frames, M is a positive integer, and j is a positive integer and ranges from 1 to M.

With reference to the fourth possible implementation manner of the first aspect, in a fifth possible implementation manner, implementation of the predicting the video encoding quality according to the complexity of content of the video and the quantization parameter of the video may be as follows:

$$d\_compression\_quality\_value = a_1 + \frac{a_2}{a_3 + \left(\frac{f\_video\_qp}{a_4 - a_5 \cdot f\_video\_content\_complexity}\right)^{a_6}},$$

where d_compression_quality_value is the video encoding quality, and $a_1$, $a_2$, $a_3$, $a_4$, $a_5$, and $a_6$ are all constants.

With reference to the fifth possible implementation manner of the first aspect, in a sixth possible implementation manner, implementation may be that a value of $a_2$ is a difference between a maximum value and a minimum value of a range of the video encoding quality.

With reference to either manner of the fifth possible implementation manner and the sixth possible implementation manner of the first aspect, in a seventh possible implementation manner, implementation may be that a value of $a_1$ is the minimum value of the range of the video encoding quality.

With reference to any manner of the third possible implementation manner to the seventh possible implementation manner of the first aspect, in an eighth possible implementation manner, the method further includes adjusting the complexity of content of the video as follows:

$$f\_video\_content\_complexity\_n = \min\left(s, \sqrt{\frac{f\_video\_content\_complexity}{num1}}\right),$$

and using adjusted f_video_content_complexity_n as the complexity of content of the video, where both s and num1 are all constants.

With reference to the eighth possible implementation manner of the first aspect, in a ninth possible implementation manner, implementation may be that a value of s is 1.0, a value of num1 is 60.0, and a value range of f_vidio_content_complexity_n is [0.0, 1.0].

With reference to any manner of the fourth possible implementation manner or the ninth possible implementation manner of the first aspect, in a tenth possible implementation manner, implementation may be that the M video frames have no packet loss.

With reference to any manner of the fourth possible implementation manner or the tenth possible implementation manner of the first aspect, in an eleventh possible implementation manner, implementation may be that the video frame includes an intra-frame encoding frame and/or an inter-frame encoding frame.

With reference to any manner of the third possible implementation manner or the eleventh possible implementation manner of the first aspect, in a twelfth possible implementation manner, implementation may be that Num is a total quantity of slices in the video frame.

With reference to any manner of the second possible implementation manner or the twelfth possible implementation manner of the first aspect, in a thirteenth possible implementation manner, implementation may be that N1 is a quantity of quantization parameters, correctly obtained by means of parsing, of slices, and the quantization parameters, correctly obtained by means of parsing, of slices indicate that the quantization parameters that are obtained by means of parsing and of the slices are correct in a case in which the first transmission packet to a transmission packet in which a quantization parameter difference of slices that is used for acquiring the quantization parameters of the slices is located, of the slices are not lost.

According to a second aspect, a device for assessing video encoding quality is provided, where the device includes: an acquiring unit configured to acquire a quantization parameter of a slice of a video frame of a video stream and a quantity of bytes per pixel of the slice of the video frame of the video stream; a determining unit configured to determine a quantization parameter of a video according to the quantization parameter, acquired by the acquiring unit, of the slice of the video frame of the video stream, and determine complexity of content of the video according to the quantity, acquired by the acquiring unit, of bytes per pixel of the slice of the video frame of the video stream; and a predicting unit configured to predict the video encoding quality according to the complexity of content of the video and the quantization parameter of the video.

With reference to the second aspect, in a first possible implementation manner, the determining unit is configured to determine an average value or a weighted average value of the quantization parameter of the slice of the video frame of the video stream as the quantization parameter of the video.

With reference to the first possible implementation manner of the second aspect, in a second possible implementation manner, the determining unit is configured to determine the quantization parameter of the video as follows:

$$f\_video\_qp = \frac{\sum_{i=1}^{N1} i\_slice\_qp_i}{N1},$$

or $$f\_video\_qp = \frac{\sum_{i=1}^{N1} w_i \cdot i\_slice\_qp_i}{\sum_{i=1}^{N1} w_i},$$

where f_video_qp is the quantization parameter of the video, N1 is a quantity of quantization parameters of slices of the video stream, $i\_slice\_qp_i$ is a quantization parameter of the $i^{th}$ slice among quantization parameters of the N1 slices, N1 is a positive integer, and $\omega_i$ is a weight corresponding to the $i^{th}$ slice.

With reference to the second aspect or either manner of the first possible implementation manner and the second possible implementation manner of the second aspect, in a third possible implementation manner, the determining unit is configured to determine a quantity of bytes per pixel of the $k^{th}$ slice among Num slices of the video frame as follows:

$$f\_slice\_byte\_per\_pixel_k = \frac{i\_slice\_size_k}{i\_slice\_pixel_k},$$

where $i\_slice\_size_k$ is a quantity of bytes of the $k^{th}$ slice among the Num slices of the video frame, $i\_slice\_pixel_k$ is a quantity of pixels of the $k^{th}$ slice among the Num slices of the video frame, and k is a positive integer, where in the video frame, k ranges from 1 to Num, and Num is a positive integer, the determining unit is configured to determine complexity of content of the $k^{th}$ slice among the Num slices of the video frame as follows:

$$f\_slice\_content\_complexity_k = a[i\_slice\_qp_k] \cdot f\_slice\_byte\_per\_pixel_k + b[i\_slice\_qp_k],$$

where both $a[i\_slice\_qp_k]$ and $b[i\_slice\_qp_k]$ are values corresponding to a quantization parameter of the $k^{th}$ slice among the Num slices of the video frame; the determining unit is configured to determine the complexity of content of the video frame as follows:

$$f\_frame\_content\_complexity = \frac{\sum_{k=1}^{Num} f\_slice\_content\_complexity_k}{Num};$$

and the determining unit is configured to determine the complexity of content of the video according to the complexity of content of the video frame.

With reference to the third possible implementation manner of the second aspect, in a fourth possible implementation manner, the determining unit is configured to determine the complexity of content of the video as follows:

$$f\_video\_content\_complexity = \frac{\sum_{j=1}^{M} f\_frame\_content\_complexity_j}{M}.$$

where the video stream includes M video frames, M is a positive integer, and j is a positive integer and ranges from 1 to M.

With reference to the fourth possible implementation manner of the second aspect, in a fifth possible implementation manner, the predicting unit is configured to predict the video encoding quality as follows:

$$d\_compression\_quality\_value = a_1 + \frac{a_2}{a_3 + \left(\frac{f\_video\_qp}{a_4 - a_5 \cdot f\_video\_content\_complexity}\right)^{a_6}},$$

where $a_1$, $a_2$, $a_3$, $a_4$, $a_5$, and $a_6$ are all constants.

With reference to the fifth possible implementation manner of the second aspect, in a sixth possible implementation manner, a value of $a_2$ is a difference between a maximum value and a minimum value of a range of the video encoding quality.

With reference to either manner of the fifth possible implementation manner and the sixth possible implementation manner of the second aspect, in a seventh possible implementation manner, a value of $a_1$ is the minimum value of the range of the video encoding quality.

With reference to any manner of the third possible implementation manner to the seventh possible implementation manner of the second aspect, in an eighth possible implementation manner, the device further includes adjusting the complexity of content of the video as follows:

$$f\_video\_content\_complexity\_n = \min\left(s, \sqrt{\frac{f\_video\_content\_complexity}{num1}}\right),$$

and using adjusted f_video_content_complexity_n as the complexity of content of the video, where both s and num1 are all constants.

With reference to the eighth possible implementation manner of the second aspect, in a ninth possible implementation manner, a value of s is 1.0, a value of num1 is 60.0, and a value range of f_video_content_complexity_n is [0.0, 1.0].

With reference to any manner of the fourth possible implementation manner or the ninth possible implementation manner of the second aspect, in a tenth possible implementation manner, the M video frames have no packet loss.

With reference to any manner of the fourth possible implementation manner or the tenth possible implementation manner of the second aspect, in an eleventh possible implementation manner, the video frame includes an intra-frame encoding frame and/or an inter-frame encoding frame.

With reference to any manner of the third possible implementation manner or the eleventh possible implementation manner of the second aspect, in a twelfth possible implementation manner, Num is a total quantity of slices in the video frame.

With reference to any manner of the second possible implementation manner or the twelfth possible implementation manner of the second aspect, in a thirteenth possible implementation manner, N1 is the quantity of quantization parameters, correctly obtained by means of parsing, of slices, and the quantization parameters, correctly obtained by means of parsing, of slices indicate that the quantization parameters that are obtained by means of parsing and of the slices are correct in a case in which the first transmission packet to a transmission packet in which a quantization parameter difference of slices that is used for acquiring the quantization parameters of the slices is located, of the slices are not lost.

In the embodiments of the present invention, a quantization parameter of a video is determined according to an acquired quantization parameter of a slice of a video frame of a video stream, complexity of content of the video is determined according to an acquired quantity of bytes per pixel of the slice of the video frame of the video stream, and video encoding quality is predicted by using the complexity of content of the video and the quantization parameter of the video. Therefore, encoding quality predicted by a model that is obtained by considering a content characteristic of the video better satisfies subjective feelings of human eyes, thereby improving accuracy of prediction.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are some but not all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, for example: a global system for communication (GSM) system, a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, a Universal Mobile Telecommunications Service (UMTS), and a Worldwide Interoperability for Microwave Access (WiMAX) communications system.

Figure 1:
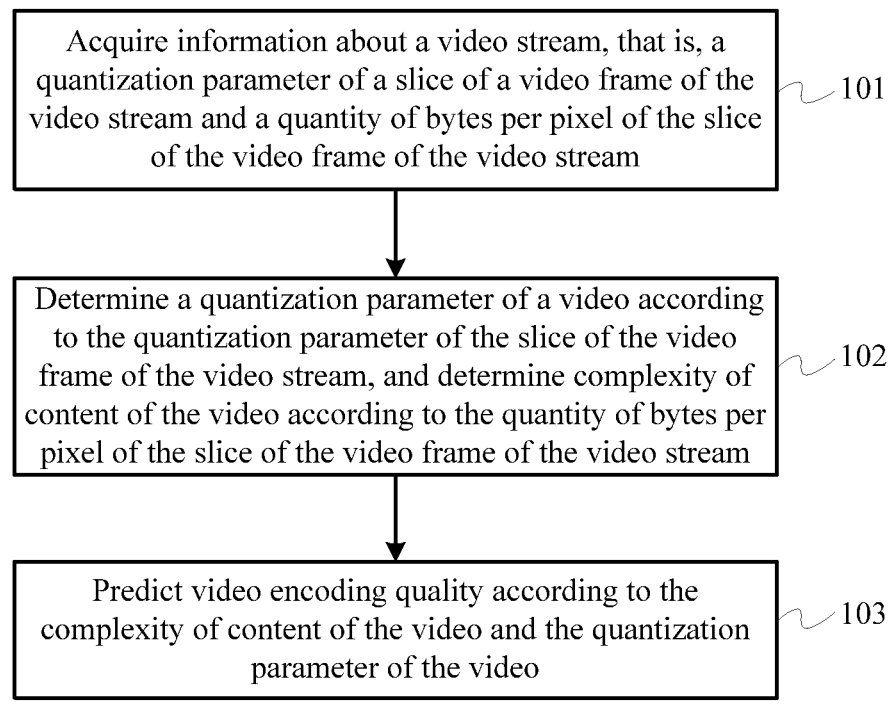
FIG. 1 is a flowchart of a method for assessing video encoding quality according to an embodiment of the present invention.

FIG. 1 is a flowchart of a method for assessing video encoding quality according to an embodiment of the present invention. The method is executed by a device for assessing the video encoding quality. The method includes the following steps.

101. Acquire a quantization parameter of a slice of a video frame of a video stream and a quantity of bytes per pixel of the slice of the video frame of the video stream.

102. Determine a quantization parameter of a video according to the quantization parameter of the slice of the video frame of the video stream, and determine complexity of content of the video according to the quantity of bytes per pixel of the slice of the video frame of the video stream.

103. Predict the video encoding quality according to the complexity of content of the video and the quantization parameter of the video.

In this embodiment of the present invention, the quantization parameter (QP) may also be expressed in another manner, that is, a quantization step (Q-step), for predicting the video encoding quality. For ease of description, in this embodiment of the present invention, in a model for predicting the video encoding quality, the quantization parameter is used as an example for description. It should be understood that, an expression manner of replacing the QP with the Q-step also falls within the scope of the present invention.

In this embodiment of the present invention, a quantization parameter of a video is determined according to an acquired quantization parameter of a slice of a video frame of a video stream, complexity of content of the video is determined according to an acquired quantity of bytes per pixel of the slice of the video frame of the video stream, and video encoding quality is predicted by using the complexity of content of the video and the quantization parameter of the video. Therefore, encoding quality predicted by a model that is obtained by considering a content characteristic of the video better satisfies subjective feelings of human eyes, thereby improving accuracy of prediction.

Optionally, in an embodiment, in step 102, the quantization parameter of the video may be determined according to the quantization parameter of the slice of the video frame of the video stream, or the quantization parameter of the video may be determined according to a quantization parameter of a macroblock of the video frame of the video stream, or the quantization parameter of the video may be determined by combining the quantization parameter of the slice of the video frame of the video stream and the quantization parameter of the macroblock of the video frame of the video stream.

A total quantity of quantization parameters of slices of the video stream is N, and quantization parameters of N1 slices may be selected from quantization parameters of N slices of the video. Preferably, a quantity of the quantization parameters of the N1 slices may be a total quantity of slices from which quantization parameters are correctly obtained by means of parsing. By using H.264 as an example, the slices from which quantization parameters are correctly obtained by means of parsing indicate that in a case in which a transmission packet in which picture initial quantization minus 26 (pic_init_qp_minus26, where pic_init_qp_minus26 is a syntactic element in an H.264 picture parameter set) in a picture parameter set (pic_parameter_set_rbsp, PPS) is located is not lost, the first transmission packet to a transmission packet in which a quantization parameter difference (slice_qp_delta, where slice_qp_delta is a syntactic element in an H.264 slice header) of slices that is used for acquiring the quantization parameters of slices is located, of the slices are not lost. In other words, the first bit to a bit that is used to parse the quantization parameter difference (slice_qp_delta, where slice_qp_delta is a syntactic element in the H.264 slice header) of the slices, of the slices, are not lost, where the quantization parameter difference of the slices is used for acquiring the quantization parameters of the slices. In this way, the quantization parameters of the slices may be correctly obtained by means of parsing. A calculation formula of the quantization parameters of the slices is as follows: i_slice_qp=26+pic_init_qp_minus26+slice_qp_delta. N is a positive integer, N1 is a positive integer, and N1≤N. Further, an average value of the quantization parameters of the N1 slices may be determined as the quantization parameter of the video that is used to predict the encoding quality. A quantization parameter of a video in the following formula (1) is f_video_qp:

$$f\_video\_qp = \frac{\sum_{i=1}^{N1} i\_slice\_qp_i}{N1}. \quad (1)$$

In the foregoing formula, $i\_slice\_qp_i$ is a quantization parameter of the $i^{th}$ slice among the quantization parameters of the N1 slices.

Optionally, the foregoing N1 may also be a quantity of quantization parameters of slices whose packets are not lost.

Optionally, a weighted average value of the quantization parameters of the N1 slices may also be determined as the quantization parameter that is used to predict the encoding quality of the video, and $w_i$ is a weight corresponding to the $i^{th}$ slice. Different weights may be assigned to different slices according to a requirement, as shown in the following formula:

$$f\_video\_qp = \frac{\sum_{i=1}^{N1} w_i \cdot i\_slice\_qp_i}{\sum_{i=1}^{N1} w_i}.$$

Further, a normalized adjustment may be performed on the quantization parameter f_video_qp of the video that is obtained by using the foregoing formulas, and an adjusted quantization parameter of the video is used to predict the encoding quality. The normalized adjustment sets all quantization parameters to fall within a determined range.

It should be understood that the foregoing example is merely exemplary, and this embodiment of the present invention imposes no limitation on how to obtain a quantization parameter of the video that is used to predict the encoding quality. An average value or a weighted average value of all quantization parameters, correctly obtained by means of parsing, of slices of intra-frame encoding frames and inter-frame encoding frames in the video may be determined as the quantization parameter of the video that is used to predict the encoding quality; or an average value or a weighted average value of all quantization parameters of slices and macroblocks in the video may be determined as the quantization parameter of the video that is used to predict the encoding quality, and the like.

Optionally, in a process of transmitting a video frame, a packet may also be lost, and calculation may be performed by selecting a slice that has a packet loss or no packet loss. It should be understood that this embodiment of the present invention imposes no limitation on this.

Optionally, the foregoing video frame may be an inter-frame encoding frame and/or an intra-frame encoding frame, where the inter-frame encoding frame may be an inter-frame encoding frame (also referred to as an inter-frame reference frame) that serves as a reference frame, for example, a P-frame or a B-frame, or may be an inter-frame encoding frame that does not serve as a reference frame, for example, b-frame. The intra-frame encoding frame may be an I-frame or an instantaneous decoding refresh (IDR) frame, and may also be referred to as an intra-frame reference frame, and the like. It should be understood that this embodiment of the present invention imposes no limitation on this.

Preferably, to determine the complexity of content of the video according to the quantity of bytes per pixel of the slice of the video frame of the video stream, complexity of content of the video frame is first determined according to the quantity of bytes per pixel of the slice of the video frame of the video stream, and the complexity of content of the video is then determined according to the complexity of content of the video frame, specifically as shown in the following formulas (2) to (4).

A quantity of bytes per pixel of the $k^{th}$ slice among Num slices of the video frame is as follows:

$$f\_slice\_byte\_per\_pixel_k = \frac{i\_slice\_size_k}{i\_slice\_pixel_k}, \quad (2)$$

where $i\_slice\_size_k$ is a quantity of bytes of the $k^{th}$ slice among the Num slices of the video frame, $i\_slice\_pixel_k$ is a quantity of pixels of the $k^{th}$ slice among the Num slices of the video frame, and k is a positive integer, where in the video frame, k ranges from 1 to Num, and Num is a positive integer.

It should be noted that, in this embodiment of the present invention, some variants may be made to the quantity of bytes per pixel, for example, the quantity of bytes per pixel may be transformed to a quantity of bits per pixel, and the quantity of bits per pixel is used to perform a corresponding operation. This variant makes equivalent replacements to this embodiment of the present invention, without departing from the scope of the present invention.

Complexity of content of the $k^{th}$ slice among the Num slices of the video frame is as follows:

$$f\_slice\_content\_complexity_k = a[i\_slice\_qp_k] \cdot f\_slice\_byte\_per\_pixel_k + b[i\_slice\_qp_k] \quad (3),$$

where both $a[i\_slice\_qp_k]$ and $b[i\_slice\_qp_k]$ are values corresponding to a quantization parameter of the $k^{th}$ slice among the Num slices of the video frame.

The complexity of content of the video frame is as follows:

$$f\_frame\_content\_complexity = \frac{\sum_{k=1}^{Num} f\_slice\_content\_complexity_k}{Num}. \quad (4)$$

Optionally, Num may be a quantity (including a quantity of slices that have a packet loss and a quantity of slices that have no packet loss) of all slices of the video frame; or Num may be a quantity of slices that have no packet loss and are of the video frame, or a quantity of slices that have a packet loss and are of the video frame, or may be a quantity of slices randomly selected from all slices of the video frame; or the like. It should be understood that this embodiment of the present invention imposes no limitation on this.

Further, to determine the complexity of content of the video according to the complexity of content of the video frame of the video stream, an average value or a weighted average value of complexity of content of multiple video frames may be determined as the complexity of content of the video that is used to predict the encoding quality, specifically as shown in the following formula (5).

The complexity of content of the video frame is as follows:

$$f\_video\_content\_complexity = \frac{\sum_{j=1}^{M} f\_frame\_content\_complexity_j}{M}, \quad (5)$$

where the video stream includes M video frames, M is a positive integer, and j is a positive integer and ranges from 1 to M. Preferably, the M video frames have no packet loss.

The complexity of content of the video may include a direction of time and/or a direction of space. In a fixed quantization parameter of particular resolution, greater complexity of content of the video indicates that distortion is less likely to be found by human eyes. The complexity of content of the video, obtained by using the foregoing technical solutions, better satisfies subjective feelings of human eyes from which greater complexity of content of the video indicates that distortion is less likely to be found by human eyes, thereby further improving accuracy of predicting the encoding quality.

For example, the video frame in the foregoing formulas from (2) to (5) is an intra-frame reference frame, that is, the complexity of content of the video may be determined by using a quantity of bytes per pixel of a slice of the intra-frame reference frame (at least one intra-frame reference frame is used). In this example, the complexity of content of the video that is determined by using the quantity of bytes per pixel of the slice of the intra-frame reference frame can effectively reflect spatial complexity f_video_content_complexity_scc of the video. Optionally, a[i_slice_qp$_k$] and b[i_slice_qp$_k$] in the formulas may be obtained by means of training, and different video resolution and/or encoding formats and/or video collection formats (that is, an interlaced scanning manner and a progressive scanning manner) may use a same value or different values. That H.264 has 52 quantization parameters (which are 0 to 51, respectively) is used as an example. Correspondingly, a[i_slice_qp$_k$] and b[i_slice_qp$_k$] in different resolution that are obtained by means of training are separately corresponding to values of quantization parameters from 0 to 51, and are exemplarily shown in the following:

a[i_slice_qp$_k$],
standard definition resolution:
{24.78954, 24.78954, 25.23854, 25.51193, 25.74990, 25.97533, 26.19479, 26.28303, 26.49158, 26.56645, 26.53197, 26.62563, 26.69239, 26.65409, 26.79309, 26.80578, 26.84816, 27.08741, 27.25370, 27.36097, 27.56078, 27.70162, 27.85621, 28.04059, 28.17621, 28.23445, 28.41471, 28.45078, 28.54265, 28.60014, 28.62930, 28.64529, 28.74102, 28.75523, 28.76358, 28.74681, 28.77488, 28.73642, 28.79531, 28.69430, 28.72766, 28.60666, 28.49484, 28.35642, 28.07614, 27.90134, 27.57123, 27.01405, 26.65987, 26.31439, 25.52575, 25.01169}
resolution of 1280×720:
{16.17209, 17.45819, 17.80732, 18.02041, 18.18083, 18.52479, 19.03342, 19.06581, 19.41564, 19.85189, 20.07956, 20.81183, 21.43127, 21.83287, 22.61658, 23.14807, 23.92571, 25.20184, 26.03683, 26.68701, 27.49974, 28.12203, 28.66205, 29.27020, 29.69070, 29.92960, 30.40275, 30.60385, 30.85636, 31.06785, 31.26051, 31.35589, 31.63646, 31.76881, 31.92259, 32.08798, 32.28134, 32.36179, 32.60119, 32.61653, 32.75291, 32.73418, 32.72940, 32.70158, 32.59009, 32.41000, 32.21505, 31.76353, 31.23468, 30.87401, 30.01071, 29.31316}
full high definition resolution (1920×1080):
{15.75673, 16.17239, 17.33657, 18.09218, 18.78856, 19.85244, 20.94081, 21.42377, 25.25608, 25.36929, 25.37671, 25.59413, 25.77414, 25.89431, 26.16539, 26.37098, 26.71202, 27.45373, 27.99336, 28.43923, 29.01115, 29.49924, 29.89337, 30.32379, 30.59313, 30.74944, 31.01314, 31.10389, 31.21737, 31.28295, 31.38585, 31.36863, 31.44693, 31.40169, 31.43938, 31.39075, 31.36072, 31.33672, 31.26816, 31.16160, 31.03165, 30.80631, 30.57609, 30.36353, 30.06076, 29.62381, 29.37353, 29.05716, 28.60942, 28.52338, 28.40104, 28.52280} b[i_slice_qp$_k$],
standard definition resolution:
{13.39250, 13.39250, 13.97091, 14.53803, 15.25528, 16.13630, 16.99497, 17.66163, 18.80068, 19.89785, 21.20091, 22.86877, 24.44105, 25.98037, 28.04957, 30.07985, 32.07935, 34.30203, 36.32256, 38.18652, 40.93258, 43.77054, 46.53546, 50.53632, 54.36178, 57.82423, 63.29899, 69.18878, 75.07466, 83.80263, 91.47496, 99.18949, 111.47580, 124.34650, 136.49900, 156.17670, 176.23080, 192.16970, 223.83720, 251.77270, 285.92790, 333.53770, 388.41820, 435.09860, 531.05070, 633.24080, 760.16820, 948.15240, 1168.53720, 1361.84570, 1759.43160, 2040.35460}
resolution of 1280×720:
{33.81798, 33.05324, 35.11725, 36.95499, 39.10951, 41.62373, 43.87256, 45.95354, 49.32386, 51.87803, 54.92251, 58.42482, 61.62755, 64.56505, 69.19412, 73.35919, 76.10406, 78.96517, 81.95586, 84.59924, 89.05335, 93.59975, 98.31476, 105.41810, 112.34964, 118.73374, 129.00992, 140.01562, 151.12381, 167.62430, 182.02425, 196.08347, 218.72591, 241.16108, 263.35157, 295.99927, 329.06899, 355.66280, 407.64235, 452.09915, 508.72302, 585.36672, 671.43978, 741.49561, 891.18944, 1051.86892, 1246.04333, 1527.50615, 1894.63282, 2204.87735, 2879.95903, 3390.89788}
full high definition resolution (1920×1080):
{25.92973, 26.42403, 26.72231, 27.10874, 27.55908, 27.59167, 27.40409, 27.63129, 21.08740, 22.32786, 23.78112, 25.55635, 27.25511, 28.80079, 31.33600, 33.71534, 35.51380, 37.14249, 38.57997, 39.75292, 41.50986, 43.25411, 45.08496, 47.92251, 50.97660, 53.82247, 58.50549, 64.00109, 69.59487, 78.31654, 84.35147, 92.89916, 105.12040, 119.83478, 131.13182, 152.46046, 175.28796, 191.40711, 231.17849, 262.14953, 311.33306, 374.98524, 454.98602, 524.68907, 656.91124, 830.55605, 990.09180, 1196.94617, 1493.32352, 1667.34794, 1966.34090, 2099.62991}

For another example, the video frame in the foregoing formulas from (2) to (5) is an inter-frame reference frame, that is, the complexity of content of the video may be determined by using a quantity of bytes per pixel of a slice of the inter-frame reference frame (at least one inter-frame reference frame is used). In this example, the complexity of content of the video that is determined by using the quantity of bytes per pixel of the slice of the inter-frame reference frame can effectively reflect time complexity f_video_content_complexity_tcc of the video. Optionally, a[i_slice_qp$_k$] and b[i_slice_qp$_k$] in the formulas may be obtained by means of training, and different video resolution and/or encoding formats and/or video collection formats (that is, an interlaced scanning manner and a progressive scanning manner) may use a same value or different values. That H.264 has 52 quantization parameters (which are 0 to 51, respectively) is used as an example. Correspondingly, a[i_slice_qp$_k$] and b[i_slice_qp$_k$] in different resolution that are obtained by means of training are separately corresponding to values of quantization parameters from 0 to 51.

It should be understood that, in the foregoing examples, selection of the video frame, the quantity of quantization parameters of slices, values of $a[i\_slice\_qp_k]$ and $b[i\_slice\_qp_k]$, and a manner of obtaining $a[i\_slice\_qp_k]$ and $b[i\_slice\_qp_k]$ are merely exemplary but not intended to limit the scope of the present invention.

It is found in an experiment that, when there is encoding compression distortion in the video, the video encoding quality decreases as the QP becomes larger. Optionally, based on the foregoing experiment, in step 102, the video encoding quality d_compression_quality_value may be predicted according to the complexity of content f_video_content_complexity of the video in the foregoing formula (5) and the quantization parameter f_video_qp of the video in the foregoing formula (1), as shown in the following formula (6).

The video encoding quality is predicted as follows:

$$d\_compression\_quality\_value = a_1 + \frac{a_2}{a_3 + \left(\frac{f\_video\_qp}{a_4 - a_5 \cdot f\_video\_content\_complexity}\right)^{a_6}}, \quad (6)$$

where $a_1$, $a_2$, $a_3$, $a_4$, $a_5$, and $a_6$ are all constants.

Optionally, in different video resolution and/or encoding formats and/or video collection formats (that is, the interlaced scanning manner and the progressive scanning manner), values of $a_1$ to $a_6$ may be the same or different. Values of $a_1$ to $a_6$ in standard definition resolution may be the same as or different from values of $a_1$ to $a_6$ in full high definition resolution, and it should be understood that this embodiment of the present invention imposes no limitation on this.

A larger value of the video encoding quality d_compression_quality_value indicates better video quality, and a smaller value of the video encoding quality d_compression_quality_value indicates poorer video quality.

Optionally, a value of $a_2$ may be a difference between a maximum value and a minimum value of a range of the video encoding quality. For example, in 5-point-scale measurement of encoding quality, a maximum value of the encoding quality is 5, and a minimum value is 1; therefore, the value of $a_2$ is 4. For another example, the value of $a_2$ may be a difference, obtained by means of training or by using experience, between the maximum value and the minimum value of the range of video encoding quality. For example, a maximum value of the encoding quality that is obtained by means of training or by using experience is 4.5, and the minimum value of the encoding quality is 1.5; therefore, the value of $a_2$ is 3. It should be understood that, in this embodiment of the present invention, a manner of predicting the encoding quality may be applied to another-point-scale measurement of encoding quality, and this embodiment of the present invention imposes no limitation on this.

Optionally, a value of $a_1$ may be the minimum value of the range of the video encoding quality.

Optionally, values of $a_1$, $a_2$, $a_3$, $a_4$, $a_5$, and $a_6$ may also be obtained according to different cases, and it should be understood that this embodiment of the present invention imposes no limitation on this. For example, values of $a_1$, $a_2$, $a_3$, $a_4$, $a_5$, and $a_6$ may also be obtained by means of training or by using experience according to different cases.

Optionally, values of $a_1$, $a_2$, $a_3$, $a_4$, $a_5$, and $a_6$ may be exemplarily shown in the following.

standard definition:
a1=1.4163,
a2=2.9116,
a3=1.0,
a4=41.5,
a5=4.7,
a6=13.0
1280×720:
a1=1.0519,
a2=3.3876,
a3=1.0,
a4=40.0,
a5=0.75,
a6=10.0
1920×1080, interlaced scanning (1920×1080i):
a1=1.2294,
a2=3.1092,
a3=1.0,
a4=41.5,
a5=0.65,
a6=10.5
1920×1080, progressive scanning (1920×1080p):
a1=1.2294,
a2=3.1092,
a3=1.0,
a4=43.0,
a5=0.85,
a6=12.0

It should be noted that a manner of using another equivalent formula to express the foregoing encoding quality falls within the scope of the present invention. For example, a video encoding distortion quality d_compression_artifact_value is obtained by subtracting the foregoing video encoding quality from the maximum value of the video encoding quality, as shown in the following formula (7):

$$d\_compression\_artifact\_value = \frac{a_2 \cdot \left(\frac{f\_video\_qp}{a_4 - a_5 \cdot f\_video\_content\_complexity}\right)^{a_6}}{a_3 + \left(\frac{f\_video\_qp}{a_4 - a_5 \cdot f\_video\_content\_complexity}\right)^{a_6}}. \quad (7)$$

In this case, a smaller video encoding distortion quality indicates better video quality, and a larger the video encoding distortion quality indicates poorer video quality.

Optionally, the complexity of content of the video in the foregoing formulas (5) to (7) may be adjusted, adjusted f_video_content_complexity_n may be used as the complexity of content of the video, where an adjustment manner is shown in the following formula (8):

$$f\_video\_content\_complexity\_n = \min\left(s, \sqrt{\frac{f\_video\_content\_complexity}{num1}}\right), \quad (8)$$

where s and num 1 are constants. For example, when a normalized adjustment is performed, a value of s is 1.0, a value of num1 is 60.0, and a value range of f_vidio_content_complexity_n is [0.0, 1.0].

It should be understood that, the complexity of content of the video may be time complexity (for example, only the inter-frame reference frame is considered for the video frame), and expressed as f_video_content_complexity=f_video_content_complexity_tcc (in the foregoing formula (5)) or f_video_content_complexity_n=f_video_content_complexity_ntcc (adjusted time complexity in the foregoing formula (8)); or may be spatial complexity (for example, only the intra-frame reference frame is considered for the video frame), and expressed as f_video_content_complexity=f_video_content_complexity_scc (in the foregoing formula (5)) or f_video_content_complexity_n= f_video_content_complexity_nscc (adjusted spatial complexity in the foregoing formula (8)); or may be a combination of the time complexity and the spatial complexity, and expressed as f_video_content_complexity=func1 (f_video_content_complexity_tcc, f_video_content_complexity_scc) or f_video_content_complexity_n=func2 (f_video_content_complexity_ntcc, f_video_content_complexity_nscc). This embodiment of the present invention imposes no limitation on this.

It should be noted that, in an embodiment that uses the formula (6) or the formula (7) to predict the encoding quality or the video encoding distortion quality, the complexity of content of the video obtained by means of adjusting in formula (8) may be used, that is, The video encoding quality may be predicted as follows:

$$d\_compression\_quality\_value = a_1 + \frac{a_2}{a_3 + \left(\frac{f\_video\_qp}{a_4 - a_5 \cdot f\_video\_content\_complexity\_n}\right)^{a_6}}, \quad (9)$$

where $a_1, a_2, a_3, a_4, a_5,$ and $a_6$ are all constants.

The video encoding quality may also be predicted as follows:

$$d\_compression\_artifact\_value = \frac{a_2 \cdot \left(\frac{f\_video\_qp}{a_4 - a_5 \cdot f\_video\_content\_complexity\_n}\right)^{a_6}}{a_3 + \left(\frac{f\_video\_qp}{a_4 - a_5 \cdot f\_video\_content\_complexity\_n}\right)^{a_6}}. \quad (10)$$

It should be understood that the adjusted complexity of content of the video f_video_content_complexity_n may be time complexity of the video f_video_content_complexity_ntcc that is obtained after a normalized adjustment, may be spatial complexity of the video f_video_content_complexity_nscc that is obtained after a normalized adjustment, or may be a combination of the time complexity f_video_content_complexity_ntcc and the spatial complexity f_video_content_complexity_nscc. It should be understood that this embodiment of the present invention imposes no limitation on this.

For example, the video encoding quality d_compression_quality_value is predicted by using the combination of the time complexity f_video_content_complexity_ntcc and the spatial complexity f_video_content_complexity_nscc, and quantization parameters f_video_qp of the video, that is, in formula (6), the complexity of content of the video uses the adjusted complexity of content of the video f_video_content_complexity_n, and $a_5$*f_video_content_complexity_n may be replaced with $a_{51}$*f_video_content_complexity_ntcc+$a_{52}$*f_video_content_complexity_nscc, where $a_{51}$ and $a_{52}$ may be the same or different.

A manner of predicting encoding quality according to this embodiment of the present invention better satisfies subjective feelings of human eyes, thereby further improving accuracy of predicting the encoding quality.

Certainly, the complexity of content of the video may be determined according to other encoding information of the video frame, for example, a quantity of encoding bytes of slices of the video frame, a motion vector difference, a motion vector value, a macroblock encoding mode, or a discrete cosine transform (DCT,) coefficient. For example, the complexity of content of the video is expressed as an average value of alternating current (AC) coefficients of DCT coefficients of all intra-frame encoding frames (I-frame/IDR frame), an average value of Direct Current (DC) coefficients of DCT coefficients of all intra-frame encoding frames (I-frame/IDR frame), an average value of DCT coefficients of all intra-frame encoding frames (I-frame/IDR frame), an average value of AC coefficients of DCT coefficients of inter-frame encoding frames, an average value of DC coefficients of DCT coefficients of inter-frame encoding frames, an average value of DCT coefficients of inter-frame encoding frames, or an average value of DCT coefficients of intra-frame encoding frames and inter-frame encoding frames. For another example, the complexity of content of the video is described by using a macroblock encoding mode (for example, 16×16, 16×8, 8×16), where more macroblock encoding modes indicate higher complexity of content of the video. For still another example, the complexity of content of the video is described by using a motion vector, where a larger motion vector indicates higher complexity of content of the video. For yet another example, the complexity of content of the video is expressed by using a proportion of inter-frame encoding blocks to intra-frame encoding blocks, where a higher proportion indicates higher complexity of content of the video. It should be understood that this embodiment of the present invention imposes no limitation on this.

Figure 2:
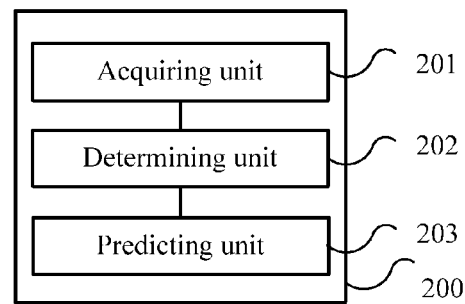
FIG. 2 is a structural block diagram of a device for assessing video encoding quality according to an embodiment of the present invention.

FIG. 2 is a structural block diagram of a device for assessing video encoding quality according to an embodiment of the present invention. The device 200 for assessing video encoding quality includes an acquiring unit 201, a determining unit 202, and a predicting unit 203.

The acquiring unit 201 is configured to acquire a quantization parameter of a slice of a video frame of a video stream and a quantity of bytes per pixel of the slice of the video frame of the video stream.

The determining unit 202 is configured to determine a quantization parameter of a video according to the quantization parameter, acquired by the acquiring unit 201, of the slice of the video frame of the video stream, and determine complexity of content of the video according to the quantity, acquired by the acquiring unit 201, of bytes per pixel of the slice of the video frame of the video stream.

The predicting unit 203 is configured to predict the video encoding quality according to the complexity of content of the video and the quantization parameter of the video that are determined by the determining unit 202.

In this embodiment of the present invention, a quantization parameter may also be expressed in another manner, that is, a quantization step (Q-step), for predicting the video encoding quality. For ease of description, in this embodiment of the present invention, in a model for predicting the video encoding quality, the quantization parameter is used as an example for description. It should be understood that, an expression manner of replacing the QP with the Q-step also falls within the scope of the present invention.

In this embodiment of the present invention, a quantization parameter of a video is determined according to an acquired quantization parameter of a slice of a video frame of a video stream, complexity of content of the video is determined according to an acquired quantity of bytes per pixel of the slice of the video frame of the video stream, and video encoding quality is predicted by using the complexity of content of the video and the quantization parameter of the video. Therefore, encoding quality predicted by a model that is obtained by considering a content characteristic of the video better satisfies subjective feelings of human eyes, thereby improving accuracy of prediction.

The device 200 may implement steps of the device for assessing video encoding quality that are involved in the method shown in FIG. 1, and to avoid repetition, details are not described herein again.

Optionally, in an embodiment, the determining unit 202 is configured to determine an average value or a weighted average value of the quantization parameter of the slice of the video frame of the video stream as the quantization parameter of the video. The determining unit 202 may be configured to:

determine f_video_qp as the quantization parameter of the video:

$$f\_video\_qp = \frac{\sum_{i=1}^{N1} i\_slice\_qp_i}{N1}, \text{ or}$$

$$f\_video\_qp = \frac{\sum_{i=1}^{N1} w_i \cdot i\_slice\_qp_i}{\sum_{i=1}^{N1} w_i},$$

where N1 is a quantity of quantization parameters of slices of the video stream, i_slice_qp is a quantization parameter of the $i^{th}$ slice among quantization parameters of N1 slices, N1 is a positive integer, and $w_i$ is a weight corresponding to the $i^{th}$ slice.

Preferably, N1 is a total quantity of quantization parameters, correctly obtained by means of parsing, of slices, and the quantization parameters, correctly obtained by means of parsing, of slices indicate that the quantization parameters that are obtained by means of parsing and of the slices are correct in a case in which the first transmission packet to a transmission packet in which a quantization parameter difference of slices that is used for acquiring the quantization parameters of the slices is located, of the slices are not lost.

Further, the determining unit 202 may perform a normalized adjustment on the quantization parameter video f_video_qp of the video that is obtained by using the foregoing formula, and use an adjusted quantization parameter of the video to predict encoding quality.

Optionally, the determining unit 202 may be configured to:

determine a quantity of bytes per pixel of the $k^{th}$ slice among Num slices of the video frame as follows:

$$f\_slice\_byte\_per\_pixel_k = \frac{i\_slice\_size_k}{i\_slice\_pixel_k},$$

where $i\_slice\_size_k$ is a quantity of bytes of the $k^{th}$ slice among the Num slices of the video frame, $i\_slice\_pixel_k$ is a quantity of pixels of the $k^{th}$ slice among the Num slices of the video frame, and k is a positive integer, where in the video frame, k ranges from 1 to Num, and Num is a positive integer.

The determining unit 202 is specifically configured to determine complexity of content of the $k^{th}$ slice among the Num slices of the video frame as follows:

$$f\_slice\_content\_complexity_k = a[i\_slice\_qp_k] \cdot f\_slice\_byte\_per\_pixel_k + b[i\_slice\_qp],$$

where both $a[i\_slice\_qp_k]$ and $b[i\_slice\_qp_k]$ are values corresponding to a quantization parameter of the $k^{th}$ slice among the Num slices of the video frame.

The determining unit 202 is configured to determine complexity of content of the video frame as follows:

$$f\_frame\_content\_complexity = \frac{\sum_{k=1}^{Num} f\_slice\_content\_complexity_k}{Num}.$$

The determining unit 202 is configured to determine the complexity of content of the video according to the complexity of content of the video frame.

Optionally, the foregoing video frame may be an inter-frame encoding frame and/or an intra-frame encoding frame, where the inter-frame encoding frame may be an inter-frame encoding frame (also referred to as an inter-frame reference frame) that serves as a reference frame, for example, a P-frame or a B-frame, or may be an inter-frame encoding frame that does not serve as a reference frame, for example, b-frame; the intra-frame encoding frame may be an I-frame or an IDR-frame, and may also be referred to as an intra-frame reference frame; and the like. It should be understood that this embodiment of the present invention imposes no limitation on this.

Further, the determining unit may be configured to determine the complexity of content of the video as follows:

$$f\_video\_content\_complexity = \frac{\sum_{j=1}^{M} f\_frame\_content\_complexity_j}{M},$$

where the video stream includes M video frames, M is a positive integer, and j is a positive integer and ranges from 1 to M.

Optionally, Num may be a quantity (including a quantity of slices that have a packet loss and a quantity of slices that have no packet loss) of all slices of the video frame; or Num may be a quantity of slices that have no packet loss and are of the video frame, or a quantity of slices that have a packet loss and are of the video frame, or may be a quantity of slices randomly selected from all slices of the video frame; or the like. It should be understood that this embodiment of the present invention imposes no limitation on this.

Optionally, the M video frames have no packet loss.

Optionally, the video frame may include an intra-frame encoding frame and/or an inter-frame encoding frame.

The complexity of content of the video may include a direction of time and/or a direction of space. In a fixed quantization parameter of particular resolution, greater complexity of content of the video indicates that distortion is less likely to be found by human eyes. The complexity of content of the video, obtained by using the foregoing technical solutions, better satisfies subjective feelings of human eyes from which greater complexity of content of the video indicates that distortion is less likely to be found by human eyes, thereby further improving accuracy of predicting the encoding quality.

Optionally, the predicting unit 203 may be specifically configured to predict the video encoding quality as follows:

$$d\_compression\_quality\_value = a_1 + \frac{a_2}{a_3 + \left(\frac{f\_video\_qp}{a_4 - a_5 \cdot f\_video\_content\_complexity}\right)^{a_6}},$$

where $a_1$, $a_2$, $a_3$, $a_4$, $a_5$, and $a_6$ are all constants.

A larger value of the video encoding quality d_compression_quality_value indicates better video quality, and a smaller value of the video encoding quality d_compression_quality_value indicates poorer video quality.

Optionally, a value of $a_2$ may be a difference between a maximum value and a minimum value of a range of the video encoding quality. For example, in 5-point-scale measurement of encoding quality, a maximum value of the encoding quality is 5, and a minimum value is 1; therefore, the value of $a_2$ is 4. For another example, the value of $a_2$ may be a difference, obtained by means of training or by using experience, between the maximum value and the minimum value of the range of video encoding quality. For example, a maximum value of the encoding quality that is obtained by means of training or by using experience is 4.5, and the minimum value of the encoding quality is 1.5; therefore, the value of $a_2$ is 3. It should be understood that, in this embodiment of the present invention, a manner of predicting the encoding quality may be applied to another-point-scale measurement of encoding quality, and this embodiment of the present invention imposes no limitation on this.

Optionally, a value of $a_1$ may be the minimum value of the range of the video encoding quality.

Optionally, values of $a_1$, $a_2$, $a_3$, $a_4$, $a_5$, and $a_6$ may also be obtained according to different cases, and it should be understood that this embodiment of the present invention imposes no limitation on this. For example, values of $a_1$, $a_2$, $a_3$, $a_4$, $a_5$, and $a_6$ may also be obtained by means of training or by using experience according to different cases.

It should be noted that a manner of using another equivalent formula to express the foregoing encoding quality falls within the scope of the present invention. For example, a video encoding distortion quality d_compression_artifact_value is obtained by subtracting the foregoing video encoding quality from the maximum value of the video encoding quality, as shown in the foregoing formula (7). In this case, a smaller video encoding distortion quality indicates better video quality, and a larger the video encoding distortion quality indicates poorer video quality.

Optionally, the determining unit 202 may be configured to adjust the complexity of content of the video as follows:

$$f\_video\_content\_complexity\_n = \min\left(s, \sqrt{\frac{f\_video\_content\_complexity}{num1}}\right).$$

where s and num 1 are constants. For example, when a normalized adjustment is performed, a value of s is 1.0, a value of num1 is 60.0, and a value range of f_vidio_content_complexity_n is [0.0, 1.0].

It should be understood that, the complexity of content of the video may be time complexity (for example, only the inter-frame reference frame is considered for the video frame), and expressed as f_video_content_complexity= f_video_content_complexity_tcc (in the foregoing formula (5)) or f_video_content_complexity_n=f_video_content_complexity_ntcc (adjusted time complexity in the foregoing formula (8)); or may be spatial complexity (for example, only the intra-frame reference frame is considered for the video frame), and expressed as f_video_content_complexity= f_video_content_complexity_scc (in the foregoing formula (5)) or f_video_content_complexity_n=f_video_content_complexity_nscc (adjusted spatial complexity in the foregoing formula (8)); or may be a combination of the time complexity and the spatial complexity, and expressed as f_video_content_complexity=func1(f_video_content_complexity_tcc, f_video_content_complexity_scc) or f_video_content_complexity_n=func2(f_video_content_complexity_ntcc, f_video_content_complexity_nscc). This embodiment of the present invention imposes no limitation on this.

It should be noted that, in an embodiment that uses the formula (6) or the formula (7) to predict the encoding quality or the video encoding distortion quality, the complexity of content of the video obtained by means of adjusting in formula (8) may be used. The adjusted complexity of content of the video f_video_content_complexity_n may be time complexity of the video f_video_content_complexity_nscc that is obtained after a normalized adjustment, may be spatial complexity of the video f_video_content_complexity_nscc that is obtained after a normalized adjustment, or may be a combination of the time complexity f_video_content_complexity_nscc and the spatial complexity f_video_content_complexity_nscc. It should be understood that this embodiment of the present invention imposes no limitation on this.

For example, the video encoding quality d_compression_quality_value is predicted by using the combination of the time complexity f_video_content_complexity_nscc and the spatial complexity f_video_content_complexity_nscc, and quantization parameters f_video_qp of the video, that is, in formula (6), the complexity of content of the video uses the adjusted complexity of content of the video f_video_content_complexity_n, and $a_5$*f_video_content_complexity_n may be replaced with $a_{51}$*f_video_content_complexity_nscc+$a_{52}$*f_video_content_complexity_nscc, where $a_{51}$ and $a_{52}$ may be the same or different.

A manner of predicting encoding quality according to this embodiment of the present invention better satisfies subjective feelings of human eyes, thereby further improving accuracy of predicting the encoding quality.

Figure 3:
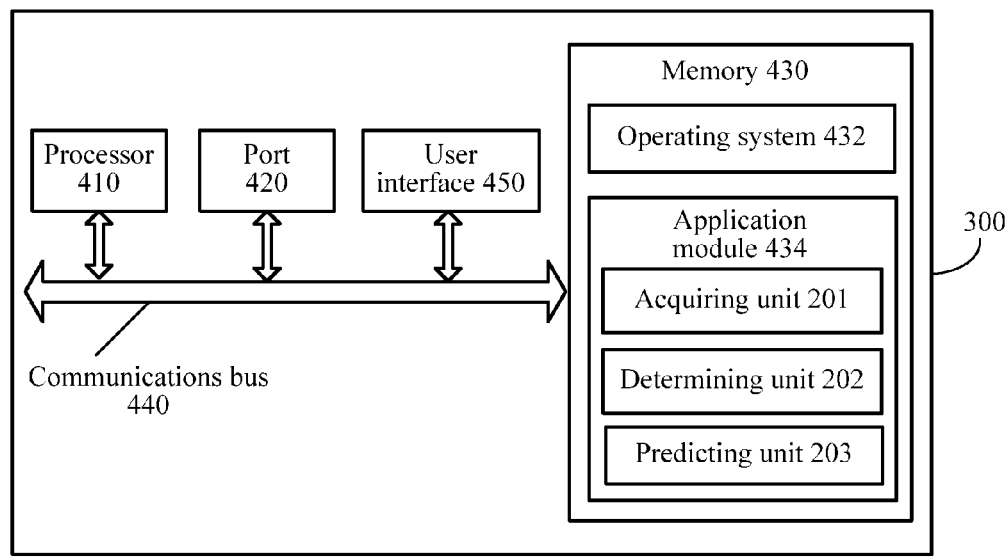
FIG. 3 is a structural block diagram of a device for assessing video encoding quality according to another embodiment of the present invention.

FIG. 3 is a structural block diagram of a device for assessing video encoding quality according to another embodiment of the present invention.

As shown in FIG. 3, at least one processor 410 such as a CPU, at least one port 420, a memory 430, and at least one communications bus 440 are generally included. The communications bus 440 is configured to implement connections and communication between these apparatuses. The processor 410 is configured to execute executable modules stored in the memory 430, for example, computer programs. Optionally, the device 300 may include a user interface 450, where the user interface 450 includes but is not limited to a display, a keyboard, and a clicking device, for example, a mouse, a trackball, a touchpad, or a touchscreen. The memory 430 may include a high-speed random access memory (RAM) memory, or may include a non-volatile memory, for example at least one disk memory.

In some implementation manners, the memory 430 stores the following elements, an executable module or a data structure, or a subset thereof, or an extension set thereof: an operating system 432, including various system programs, and configured to implement various basic services and process hardware-based tasks, and an application module 434, including various applications, and configured to implement various application services.

The application module 434 includes but is not limited to an acquiring unit 201, a determining unit 202, and a predicting unit 203.

For specific implementation of units in the application module 434, refer to corresponding units in the embodiment shown in FIG. 2, and details are not described herein again.

The foregoing device for assessing video encoding quality may be a terminal, for example, a portable, pocket-sized, handheld, computer-built-in, or vehicle-mounted mobile apparatus, or the device may be a server, or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a universal serial bus (USB) flash drive, a removable hard disk, a ROM, a random access memory (RAM), a magnetic disk, or an optical disc.

What is claimed is:

1. A method for assessing video encoding quality, comprising:

acquiring a quantization parameter of a slice of a video frame of a video stream and a quantity of bytes per pixel of the slice of the video frame of the video stream;

determining a quantization parameter of a video according to the quantization parameter of the slice of the video frame of the video stream;

determining a complexity of content of the video according to the quantity of bytes per pixel of the slice of the video frame of the video stream; and predicting the video encoding quality according to the complexity of the content of the video and the quantization parameter of the video, wherein determining the complexity of the content of the video according to the quantity of bytes per pixel of the slice of the video frame of the video stream comprises:

determining a quantity of bytes per pixel of the $k^{th}$ slice among Num slices of the video frame using the following formula:

$$f\_slice\_byte\_per\_pixel_k = \frac{i\_slice\_size_k}{i\_slice\_pixel_k},$$

wherein $i\_slice_{13}\ size_k$ is a quantity of byes of the $k^{th}$ slice among the Num slices of the video frame, wherein $i\_slice\_pixel_k$ is a quantity of pixels of the $k^{th}$ slice among the Num slices of the video frame, wherein k is a positive integer, wherein in the video frame, k ranges from 1 to Num, and wherein Num is a positive integer:

determining complexity of content of the $k^{th}$ slice among the Num slices of the video frame using the following formula:

$f\_slice\_content\_complexity_k = a[i\_slice\_qp_k] \cdot f\_slice\_byte\_per\_pixel_k + b[i\_slice\_qp_k]$, wherein both $a[i\_slice\_qp_k]$ and $b[i\_slice\_qp_k]$ are values corresponding to a quantization parameter of the $k^{th}$ slice among the Num slices of the video frame;

determining complexity of content of the video frame using the following formula:

$$f\_frame\_content\_complexity = \frac{\sum_{k=1}^{Num} f\_slice\_content\_complexity_k}{Num};$$

and determining the complexity of the content of the video according to the complexity of the content of the video frame.

2. The method according to claim 1, wherein determining the quantization parameter of the video according to the quantization parameter of the slice of the video frame of the video stream comprises determining an average value of quantization parameters of slices of the video frame of the video stream as the quantization parameter of the video.

3. The method according to claim 2, wherein determining the average value or the weighted average value of the quantization parameters of the slices of the video frame of the video stream as the quantization parameter of the video comprises using the following formula:

$$f\_video\_qp = \frac{\sum_{i=1}^{N1} i\_slice\_qp_i}{N1},$$

wherein $f\_video\_qp$ is the quantization parameter of the video, wherein N1 is a quantity of the quantization parameters of the slices of the video stream, wherein $i\_slice\_qp_i$ is a quantization parameter of the $i^{th}$ slice among the quantization parameters of the N1 slices, wherein N1 is a positive integer, and wherein $w_i$ is a weight corresponding to the $i^{th}$ slice.

4. The method according to claim 1, wherein determining the complexity of the content of the video according to the complexity of the content of the video frame comprises using the following formula:

$$f\_video\_conent\_complexity = \frac{\sum_{j=1}^{M} f\_frame\_content\_complexity_j}{M},$$

wherein $f\_video\_content\_complexity$ is the complexity of the content of the video, wherein the video stream comprises M video frames, wherein M is a positive integer, and wherein j is a positive integer and ranges from 1 to M.

5. The method according to claim 4, wherein predicting the video encoding quality according to the complexity of the content of the video and the quantization parameter of the video comprises using the following formula:

$$d\_compression\_quality\_value = a_1 + \frac{a_2}{a_3 + \left(\frac{f\_video\_qp}{a_4 - a_5 \cdot f\_video\_content\_complexity}\right)^{a_6}},$$

and wherein $d\_compression\_quality\_value$ is the video encoding quality, and wherein $a_1, a_2, a_3, a_4, a_5$, and $a_6$ are all constants.

6. The method according to claim 5, wherein a value of $a_2$ is a difference between a maximum value and a minimum value of a range of the video encoding quality.

7. The method according to claim 5, wherein a value of $a_1$ is a minimum value of a range of the video encoding quality.

8. The method according to claim 1 further comprising:
adjusting the complexity of the content of the video using the following formula:

$$f\_video\_content\_complexity\_n = \min\left(s, \sqrt{\frac{f\_video\_content\_complexity}{num1}}\right);$$

and
using adjusted $f\_video\_content\_complexity\_n$ as the content of the video,
wherein both s and num1 are constants.

9. The method according to claim 8, wherein a value of s is 1.0, wherein a value of num1 is 60.0, and wherein a value range of $f\_video\_content\_complexity\_n$ is [0.0, 1.0].

10. The method according to claim 4, wherein the M video frames have no packet loss.

11. The method according to claim 1, wherein Num is a total quantity of slices in the video frame.

12. A device for assessing video encoding quality, comprising:
a memory comprising instructions; and
a processor coupled to the memory, wherein the instructions, when executed on the processor, cause the processor to:
acquire a quantization parameter of a slice of a video frame of a video stream and a quantity of bytes per pixel of the slice of the video frame of the video stream;
determine a quantization parameter of a video according to the quantization parameter of the slice of the video frame of the video stream;
determine a complexity of content of the video according to the quantity of bytes per pixel of the slice of the video frame of the video stream;
predict the video encoding quality according to the complexity of the content of the video and the quantization parameter of the video; and
determine a quantity of bytes per pixel of the $k^{th}$ slice among Num slices of the video frame using the following formula:

$$f\_slice\_byte\_per\_pixel_k = \frac{i\_slice\_size_k}{i\_slice\_pixel_k},$$

wherein $i\_slice\_size_k$ is a quantity of bytes of the $k^{th}$ slice among the Num slices of the video frame,
wherein $i\_slice\_pixel_k$ is a quantity of pixels of the $k^{th}$ slice among the Num slices of the video frame,
wherein k is a positive integer,
wherein in the video frame, k ranges from 1 to Num,
wherein Num is a positive integer,
wherein the complexity of the content of the $k^{th}$ slice among the Num slices of the video frame is determined as follows:

$$f\_slice\_content\_complexity_k = a[i\_slice\_qp_k] \cdot f\_slice\_byte\_per\_pixel_k + b[i\_slice\_qp_k],$$

wherein both $a[i\_slice\_qp_k]$ and $b[i\_slice\_qp_k]$ are values corresponding to a quantization parameter of the $k^{th}$ slice among the Num slices of the video frame,
wherein the complexity of content of the video frame is determined using the following formula:

$$f\_frame\_content\_complexity = \frac{\sum_{k=1}^{Num} f\_slice\_content\_complexity_k}{Num},$$

and wherein the complexity of the content of the video is determined according to the complexity of the content of the video frame.

13. The device according to claim 12, wherein the instructions further cause the processor to be configured to determine an average value of quantization parameters of slices of the video frame of the video stream as the quantization parameter of the video.

14. The device according to claim 13, wherein the quantization parameter of the video is determined using the following formula:

$$f\_video\_qp = \frac{\sum_{i=1}^{N1} i\_slice\_qp_i}{N1},$$

wherein f_video_qp is the quantization parameter of the video, wherein N1 is a quantity of the quantization parameters of the slices of the video stream, wherein $i\_slice\_qp_i$ is a quantization parameter of the $i^{th}$ slice among the quantization parameters of the N1 slices, wherein N1 is a positive integer, and wherein $w_i$ is a weight corresponding to the $i^{th}$ slice.

15. The device according to claim 12, wherein the complexity of the content of the video is determined using the following formula:

$$f\_video\_conent\_complexity = \frac{\sum_{j=1}^{M} f\_frame\_content\_complexity_j}{M},$$

wherein the video stream comprises M video frames, wherein M is a positive integer, and wherein j is a positive integer and ranges from 1 to M.

16. The device according to claim 15, wherein the video encoding quality is predicted using the following formula:

$$d\_compression\_quality\_value = a_1 + \frac{a_2}{a_3 + \left(\frac{f\_video\_qp}{a_4 - a_5 \cdot f\_video\_content\_complexity}\right)^{a_6}},$$

and wherein $a_1$, $a_2$, $a_3$, $a_4$, $a_5$, and $a_6$ are all constants.

17. The device according to claim 16, wherein a value of $a_2$ is a difference between a maximum value and a minimum value of a range of the video encoding quality.

18. The device according to claim 16, wherein a value of $a_1$ is a minimum value of a range of the video encoding quality.

19. The device according to claim 12, wherein the instructions further cause the processor to be configured to:

adjust the complexity of the content of the video using the following formula:

$$f\_video\_content\_complexity\_n = \min\left(s, \sqrt{\frac{f\_video\_content\_complexity}{num1}}\right);$$

and use adjusted f_video_content_n as the complexity of the content of the video, and wherein both s and num1 are constants.

20. The device according to claim 19, wherein a value of s is 1.0, wherein a value of num1 is 60.0, and wherein a value range of f_vidio_content$_{13}$ complexity_n is [0.0, 1.0].

21. The device according to claim 15, wherein the M video frames have no packet loss.

22. The device according to claim 12, wherein Num is a total quantity of slices in the video frame.

23. The device according to claim 12, wherein the instructions further cause the processor to be configured to determine a weighted average value of quantization parameters of slices of the video frame of the video stream as the quantization parameter of the video.

24. The device according to claim 13, wherein the quantization parameter of the video is determined using the following formula:

$$f\_video\_qp = \frac{\sum_{i=1}^{N1} w_i \cdot i\_slice\_qp_i}{\sum_{i=1}^{N1} w_i},$$

wherein f_video_qp is the quantization parameter of the video, wherein N1 is a quantity of the quantization parameters of the slices of the video stream, wherein $i\_slice\_qp_i$ is a quantization parameter of the $i^{th}$ slice among the quantization parameters of the N1 slices, wherein N1 is a positive integer, and wherein $w_i$ is a weight corresponding to the $i^{th}$ slice.

25. The method according to claim 1, wherein determining the quantization parameter of the video according to the quantization parameter of the slice of the video frame of the video stream comprises determining a weighted average value of quantization parameters of slices of the video frame of the video stream as the quantization parameter of the video.

26. The method according to claim 2, wherein determining the average value or the weighted average value of the quantization parameters of the slices of the video frame of the video stream as the quantization parameter of the video comprises using the following formula:

$$f\_video\_qp = \frac{\sum_{i=1}^{N1} w_i \cdot i\_slice\_qp_i}{\sum_{i=1}^{N1} w_i},$$

wherein f_video_qp is the quantization parameter of the video, wherein N1 is a quantity of the quantization parameters of the slices of the video stream, wherein $i\_slice\_qp_i$ is a quantization parameter of the $i^{th}$ slice among the quantization parameters of the N1 slices, wherein N1 is a positive integer, and wherein $w_i$ is a weight corresponding to the $i^{th}$ slice.

* * * * *

UNITED STATES PATENT AND TRADEMARK OFFICE
CERTIFICATE OF CORRECTION

PATENT NO. : 9,774,855 B2
APPLICATION NO. : 14/751373
DATED : September 26, 2017
INVENTOR(S) : Shan Gao and Lina Sun It is certified that error appears in the above-identified patent and that said Letters Patent is hereby corrected as shown below:

In the Claims

Column 23, Claim 3, Lines 15-20 should read:

$$f\_video\_qp = \frac{\sum_{i=1}^{N1} i\_slice\_qp_i}{N1} \text{ [[, or }} f\_video\_qp = \frac{\sum_{i=1}^{N1} w_i \cdot i\_slice\_qp_i}{\sum_{i=1}^{N1} w_i} \text{ ]],}$$

wherein f_video_qp is the quantization parameter of the

Column 25, Claim 14, Lines 21-24 should read:

$$f\_video\_qp = \frac{\sum_{i=1}^{N1} i\_slice\_qp_i}{N1} \text{ [[, or }} f\_video\_qp = \frac{\sum_{i=1}^{N1} w_i \cdot i\_slice\_qp_i}{\sum_{i=1}^{N1} w_i} \text{ ]],}$$

Signed and Sealed this
Twenty-eighth Day of November, 2017

Joseph Matal
*Performing the Functions and Duties of the
Under Secretary of Commerce for Intellectual Property and
Director of the United States Patent and Trademark Office*